(12) United States Patent
Gupta et al.

(10) Patent No.: US 9,625,889 B2
(45) Date of Patent: Apr. 18, 2017

(54) APPLICATIONS OF NON-INTRUSIVE LOAD MONITORING AND SOLAR ENERGY DISAGGREGATION

(71) Applicant: Bidgely Inc., Sunnyvale, CA (US)

(72) Inventors: Abhay Gupta, Cupertino, CA (US); Ye He, Mountain View, CA (US); Vivek Garud, Cupertino, CA (US); Hsien-Ting Cheng, San Jose, CA (US); Rahul Mohan, Sunnyvale, CA (US)

(73) Assignee: Bidgely Inc., Sunnyvale, CA (US)

( * ) Notice: Subject to any disclaimer, the term of this patent is extended or adjusted under 35 U.S.C. 154(b) by 396 days.

(21) Appl. No.: 14/159,058

(22) Filed: Jan. 20, 2014

(65) Prior Publication Data
US 2014/0207298 A1  Jul. 24, 2014

Related U.S. Application Data

(60) Provisional application No. 61/754,436, filed on Jan. 18, 2013, provisional application No. 61/904,608, filed on Nov. 15, 2013.

(51) Int. Cl.
*G05D 3/12* (2006.01)
*G05B 15/02* (2006.01)

(52) U.S. Cl.
CPC ...... *G05B 15/02* (2013.01); *G05B 2219/2642* (2013.01)

(58) Field of Classification Search
CPC ...................................................... G05B 15/02
(Continued)

(56) References Cited

U.S. PATENT DOCUMENTS 6,996,508 B1 * 2/2006 Culp ............... G06Q 50/06
700/291
9,213,050 B2 * 12/2015 Owen ............... G01R 22/063
(Continued)

OTHER PUBLICATIONS

LaMarche, Janelle, et al. "Home energy management products & trends." Fraunhofer Center for Sustainable Energy Systems (2011). pp. 1-11.*
(Continued)

*Primary Examiner* — Satish Rampuria
(74) *Attorney, Agent, or Firm* — Landmark Intellectual Property Law, PLLC (57) ABSTRACT

Aspects in accordance with embodiments of the invention may include a method for remotely setting, controlling, or modifying settings on a programmable communicating thermostat (PCT) in order to customize settings to a specific house and user, including steps of: receiving at a remote processor information entered into the PCT by the user; receiving at the remote processor: non-electrical information associated with the specific house or user; and energy usage data of the specific house; performing by the remote processor energy disaggregation on the energy usage data; determining by the remote processor a custom schedule for the PCT based upon the information entered by the user, the non-electrical information associated with the specific house or user, and disaggregated energy usage data; revising by the remote processor, the custom schedule for the PCT based upon additional user input or seasonal changes; providing the custom schedule for the PCT to the PCT.

26 Claims, 9 Drawing Sheets

(58) Field of Classification Search
USPC .......................................................... 700/291
See application file for complete search history.

(56) References Cited

U.S. PATENT DOCUMENTS

| | | | |
|---|---|---|---|
| 2005/0102068 A1* | 5/2005 | Pimputkar | H02J 3/14 700/291 |
| 2009/0093916 A1* | 4/2009 | Parsonnet | F24F 5/0017 700/286 |
| 2009/0195349 A1 | 8/2009 | Frader-Thompson et al. | |
| 2011/0277471 A1 | 11/2011 | Shinnar | |
| 2011/0282504 A1* | 11/2011 | Besore | H02J 3/14 700/291 |
| 2012/0053740 A1 | 3/2012 | Venkatakrishnan et al. | |
| 2012/0166115 A1 | 6/2012 | Apostolakis | |

OTHER PUBLICATIONS

Kiliccote, S., et al. "Open automated demand response for small commercial buildings." LNBL-2195E, Lawrence Berkeley National Laboratory, Berkeley, CA (2009). pp. 1-101.*
Barbier, Franck, Nicolas Belloir, and Jean-Michel Bruel. "Incorporation of test functionality into software components." COTS-Based Software Systems. Springer Berlin Heidelberg, 2003.pp. 25-35.*
International Search Report dated Dec. 8, 2014; 3 pages.

* cited by examiner

APPLICATIONS OF NON-INTRUSIVE LOAD MONITORING AND SOLAR ENERGY DISAGGREGATION

RELATED APPLICATIONS

This application claims priority to U.S. Provisional Patent Application Ser. No. 61/904,608 filed on Nov. 15, 2013 entitled "Solar Energy Disaggregation Techniques for Whole-House Energy Consumption Data." This application also claims priority to U.S. Provisional Patent Application Ser. No. 61/754,436 filed on Jan. 18, 2013, entitled "Novel Applications Using Appliance Load Profiles Generated from Non-Intrusive Load Monitoring."

BACKGROUND OF THE INVENTION

The present invention is generally directed to systems and methods of non-intrusive appliance load monitoring ("NIALM"). Specifically, the present invention is directed to different techniques for disaggregating low resolution data to determine certain or specific appliance usage.

Appliance load monitoring is an effective way to communicate to users the amount of energy usage required by various appliances. Presenting users with such information in an understandable format allows users to take appropriate action to actively reduce total energy consumption. Moreover, providing itemized information per specific appliance also permits users to determine if acquiring a new or replacement appliance (for example, through purchase, lease, or rental) would reduce energy costs sufficient to validate the price of purchase, lease, or rental. NIALM enables the breakdown of electricity usage for a property without entering the property or applying any sub-metering devices on the individual appliances/devices/loads inside the property. In general, NIALM is known in the prior art. For example, U.S. Pat. No. 4,858,141 to Hart et al. ("Hart") discusses basic techniques for performing NIALM. Hart teaches generating and using appliance load signatures to extract information for individual loads from whole property load profile data measured by the utility meter. As taught by Hart, information extracted from the utility meter may comprise: power consumption; times when the appliance/load was turned on and off; and appliance/load health.

There has been research in the area of NIALM and various papers have been published on techniques used to define load signatures and run pattern recognition algorithm on the load profile of the property under inspection. Typically, a software analysis is performed on past data collected Therefore such prior art techniques may be useful in breaking down the energy usage or itemizing the electric energy bill post-consumption, but fail to provide near real-time information that may immediately empower users to modify their energy usage. With regard to appliances such as heating or air conditioning—for which usage is based upon immediate conditions—such data of previous usage may provide limited assistance in modifying present behavior and usage.

However, prior art techniques generally fail to account for an input that may be provided by home-installed power generating devices—specifically, solar panels. Yet, the inclusion of such information is desirable in order to provide more accurate results and to assist both utilities and consumers reduce energy consumption, peak load and renewable allocation, and increase utility operational effectiveness. In addition, even if a consumer does not have a home equipped with power generating devices, such as solar panels, techniques that include solar panel calculations may be desirable in order to provide actual, home-specific, information to a consumer of the potential impact such devices may have on the consumer's home and energy usage.

Moreover, prior art techniques and methodologies may provide users with some basic information regarding their power consumption—but fail to provide the user with any additional advice or counseling as to how to effectively use the information to reduce energy consumption. Rather, the user is left with the notion that he or she should simply use particular appliances less often. This information is relatively meaningless with regard to appliances that users generally must use—for example, refrigerators, electric ranges, washing machines, dryers, etc. In addition, with regard to economic efficiency, the time of energy usage may dictate the cost of such usage. For example, during peak energy usage times, utility companies may charge increased rates than during low usage times. Merely changing the time of day a particular appliance is used may result in significant cost savings.

SUMMARY OF THE INVENTION

Some aspects in accordance with some embodiments of the present invention may include aspects in accordance with some embodiments of the present invention may include a method for remotely setting, controlling, or modifying settings on a programmable communicating thermostat (PCT) in order to customize settings to a specific house and user, comprising: receiving at a remote processor information entered into the PCT by the user; receiving at the remote processor: non-electrical information associated with the specific house or user; and energy usage data of the specific house; performing by the remote processor energy disaggregation on the energy usage data; determining by the remote processor a custom schedule for the PCT based upon the information entered by the user, the non-electrical information associated with the specific house or user, and disaggregated energy usage data; revising by the remote processor, the custom schedule for the PCT based upon additional user input or seasonal changes; providing the custom schedule for the PCT to the PCT.

Some aspects in accordance with some embodiments of the present invention may include a method for remotely setting, controlling, or modifying settings on a programmable communicating thermostat (PCT) in order to customize settings to a specific house and user, comprising: receiving at a remote processor information entered into the PCT by the user, the information comprising temperature set points and start and end times, the information received via a network connection between the PCT and the processor; receiving at the remote processor: non-electrical information associated with the specific house or user, non-electrical information received from a plurality of information sources, including publicly available database and weather data; and energy usage data of the specific house, received from a utility, Smart Meter, or measuring device; performing by the remote processor energy disaggregation on the energy usage data, the energy disaggregation comprising determining any contribution from solar panels and adjusting for such contribution; determining by the remote processor a plurality of custom schedules for the PCT based upon the information entered by the user, the non-electrical information associated with the specific house or user, and disaggregated energy usage data; revising by the remote processor, the custom schedule for the PCT based upon additional user input or seasonal changes; providing the custom schedule for the PCT to the PCT.

Some aspects in accordance with some embodiments of the present invention may include a method for remotely setting, controlling, or modifying settings on a programmable communicating thermostat (PCT) in order to customize settings to a specific house and user, comprising: receiving at a remote processor information entered into the PCT by the user; receiving at the remote processor: non-electrical information associated with the specific house or user; and energy usage data of the specific house; performing by the remote processor energy disaggregation on the energy usage data; determining by the remote processor one or more custom schedules for the PCT comprising an active schedule that is implemented by the PCT when the specific house is determined to be occupied, a passive schedule that is implemented by the PCT when the specific house is determined to not be actively occupied, and/or a not-at-home schedule, that is implemented by the PCT when the specific house is determined to not be occupied, the customer PCT schedules based upon the information entered by the user, the non-electrical information associated with the specific house or user, and disaggregated energy usage data; revising by the remote processor, the custom schedule for the PCT based upon additional user input or seasonal changes; providing the custom schedule for the PCT to the PCT.

These and other aspects will become apparent from the following description of the invention taken in conjunction with the following drawings, although variations and modifications may be effected without departing from the scope of the novel concepts of the invention.

BRIEF DESCRIPTION OF THE DRAWINGS

The present invention can be more fully understood by reading the following detailed description together with the accompanying drawings, in which like reference indicators are used to designate like elements. The accompanying figures depict certain illustrative embodiments and may aid in understanding the following detailed description. Before any embodiment of the invention is explained in detail, it is to be understood that the invention is not limited in its application to the details of construction and the arrangements of components set forth in the following description or illustrated in the drawings. The embodiments depicted are to be understood as exemplary and in no way limiting of the overall scope of the invention. Also, it is to be understood that the phraseology and terminology used herein is for the purpose of description and should not be regarded as limiting. The detailed description will make reference to the following figures, in which.

Before any embodiment of the invention is explained in detail, it is to be understood that the present invention is not limited in its application to the details of construction and the arrangements of components set forth in the following description or illustrated in the drawings. The present invention is capable of other embodiments and of being practiced or being carried out in various ways. Also, it is to be understood that the phraseology and terminology used herein is for the purpose of description and should not be regarded as limiting.

DETAILED DESCRIPTION

The matters exemplified in this description are provided to assist in a comprehensive understanding of various exemplary embodiments disclosed with reference to the accompanying figures. Accordingly, those of ordinary skill in the art will recognize that various changes and modifications of the exemplary embodiments described herein can be made without departing from the spirit and scope of the claimed invention. Descriptions of well-known functions and constructions are omitted for clarity and conciseness. Moreover, as used herein, the singular may be interpreted in the plural, and alternately, any term in the plural may be interpreted to be in the singular.

Note that while the preceding and following disclosure primarily discusses monitoring and reporting electric usage, it is fully contemplated by the applicants that such systems and methods disclosed herein may also be used to monitor other types of energy consumption—for example natural gas, propane, and water consumption.

As stated above, the present invention is generally directed to novel applications of non-intrusive appliance load monitoring and solar energy disaggregation. Note that the solutions set forth in the present invention that are directed or include solar energy disaggregation are also applicable to consumers who are not equipped with solar generation, as such solutions may provide unequipped consumers with data and information relating to potential energy savings under various levels of solar capacity. Such information may assist consumers in identifying any potential and optimal solar panel installation.

The systems and methods of the present invention are unique over the prior art for a number of reasons. For example, the present invention is capable of predicting solar output on unseen homes using training data from different locations around the world. This predictive model may be applicable to locations other than where it was trained. For example, a model may be trained on the west coast of the United States (e.g., California), but may be used to predict solar output on the east coast of the United States (e.g., Connecticut).

Moreover, disaggregation models in accordance with some embodiments of the present invention may be used to derive solar capacity for a specific home by reviewing and analyzing a historical net power signature of the home. Such models may not require any special hardware to be installed at or on the home to predict such solar capacity. For example, such disaggregation models may determine that solar capacity may be a function of the square footage and orientation of the solar panels, without requiring actual input of either variable.

Techniques for energy disaggregation may be determined and/or impacted by the type of data and/or how the data is obtained or accessed. For example, data types may include power signals, or meteorological data or conditions. Power signals may be obtained in low frequency or high frequency samples. Low frequency data may be sampled—for example—hourly, while high or higher frequency data may be sampled—for example—each minute. Meteorological data or conditions may include information such as, but not limited to, (i) skycover or cloud cover (which may be set forth as a percentage or ratio of cover to clear sky); (ii) temperature; (iii) wind-speed; (iv) dew point; and (v) sunrise/sunset times.

Data may be obtained and/or accessed in various manners. For example, a current clamp (CT clamp) may be utilized. The use of two (2) CT clamps may generally be required, with one CT claim positioned at or proximate to the net meter (which may indicate net power draw for the house), and a second CT clamp positioned at or proximate to the solar system (which may indicate power captured and contributed by the solar system). Alternatively, energy usage data may be obtained from Green Button (an industry effort to provide transparent energy usage data, which is generally provided in hourly intervals); from Smart Meters—for example using a Smart Meter Home Area Network channel; from a Zigbee connection (which, utilizes data captured by the Zigbee alliance that sets forth energy consumption data); or from a direct connection to a solar company, for example through the use of an application programming interface (API) that connects with a solar company to obtain energy data (either net usage or solar contribution).

Based upon various combinations of data sets, different techniques may be used to disaggregate the data. Exemplary data sets in accordance with some embodiments of the present invention may be seen in FIG. 1. Current government policies and the consumer attitudes are driving the electric, gas and water utilities to make the consumer energy, water and gas consumption data available. This information may be used by the consumers or consumer authorized third parties for specific presentation and analytics. At least one goal of the availability of such information is to empower consumer with actionable information and influence consumer behavior to participate in energy saving actions.

Yet, the consumption data collected by utilities may not always have the highest resolution and therefore information may be lost when the data is sampled. For example, this may result when data is collected at large time intervals or low frequency sampling.

However, utilizing methods and systems disclosed herein and according to some embodiments of the present invention, the consumption data captured by utilities may be analyzed, possibly with the aid of separately collected high resolution data. The analytics generated and results or conclusions may be applied to the low resolution data, therefore making it possible to help consumers save energy on a larger scale. This may be accomplished even though the data from utilities alone may not include information specific enough to generate same analytical results.

Figure 1:
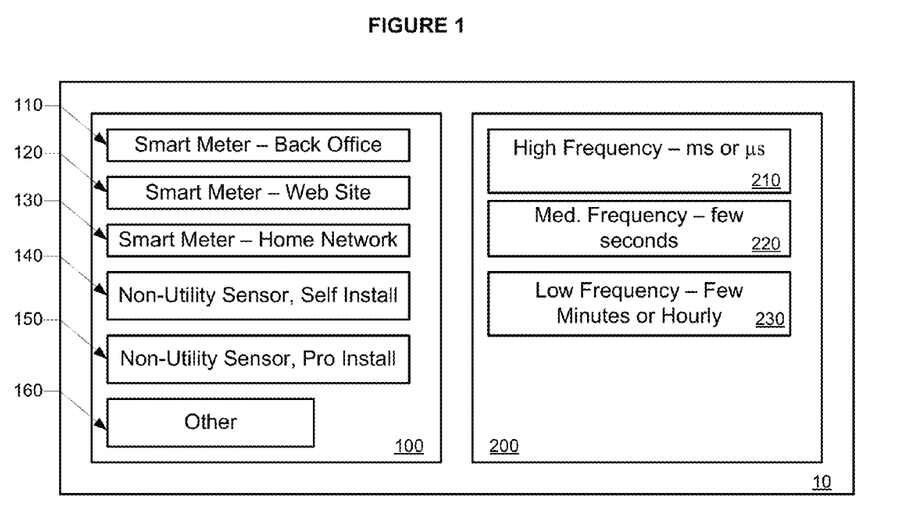
FIG. 1 depicts exemplary sources and resolution of data sets that may be used in systems and methods in accordance with some embodiments of the present invention.

With reference to FIG. 1, sources of data 100 and exemplary resolution of such data 200 will now be discussed. Sources of data 100 may vary, and may comprise elements such as: information from a processing utility 110 (which may be thought of as "back office" information, or information that is used by the utility typically for billing purposes, note that customer consent is likely need to obtain this information); information from a utility web site 120 (for example a customer may download account information and provide the same; alternatively, the customer may provide a third party with access and the third party may "scrape" the website of the utility); directly from the smart meter if there is a home area network 130; an additional, consumer installed, meter or usage sensor 140; an additional meter or usage sensor installed by a third party (not the utility) 150; or any other sort of data input 160.

The resolution of the data 200 may, in general, be divided into three categories of high resolution 210, medium resolution 220, and low resolution 230. High resolution data 210 may be sampled at a higher frequency, for example every millisecond or microsecond. Medium resolution data 220 may be sampled at a frequency of around every few seconds. Low resolution data 230 may be sampled at a low frequency, for example every several minutes or every hour.

In order to provide reliable, reasonably specific NILM on low frequency data, several overarching techniques may be used. For example, a first technique may comprise estimating a portion of energy from the whole house waveform that is attributed to a specific appliance category. Some appliances—for example: pool pumps, air conditioners, furnaces, etc.—may be able to be culled out of the whole house waveform. A second technique may be to use a training set to assist the system in learning the energy consumption patterns of various appliance categories in relation to specific signatures and/or parameters.

In order to properly "train" a system to disaggregate results from low resolution data, training data may be utilized. Training data may comprise a data set with medium or high resolution, and comprising information required to process non-intrusive load monitoring ("NILM") in order to extract information associated with individual appliances.

In contrast to the training data, actual data (or "test data") may comprise a low resolution data set that may not have sufficient content to process NILM algorithms. Such test data may be used to process high-level analysis, but results are generally inferior to analyses that process medium or high resolution data.

Note that training data can be data received from the actual home in question—for example, through user training directed at specific appliances in the home—or can be data associated with any number or plurality of other homes, neighborhoods, communities or other information. For example, in order to obtain more accurate results, a user can train appliances in his or her home. This data directly corresponds to the appliances used in the home. Accordingly, even when low resolution data is received, medium or high resolution training data provided by the user can be used to determine individual and/or specific appliance load profiles.

Alternatively, a user may not undergo the time or effort of training, instead relying upon a larger database of both non-electric data and training data received from others. In this situation, various features of the user's home (which may, for example, be identified through the use of non-electrical data, such as square footage, age of construction, heating or cooling degree days, etc.) may be identified in the training data.

Groupings of the training data may be utilized to provide a feature classification based upon the most comparable data. For example, home size may provide grouping. Data associated with a 1200 square foot home may not provide sufficiently comparable data to determine the load on a heating or cooling system used in a 4500 square foot home. Similarly, homes built during the same time period in the same geographic area are likely to have comparable insulation. Even the number of residents of a home may provide information useful in grouping the data. A home with two adults and five children will generally require laundry machines to run more often than single-person homes. Homes with pools may require the use of a periodic pool pump. Each of these features can be associated with stored training data.

Accordingly, low resolution data can be processed through a trained classifier or a regression model to determine the likely presence and operation of one or more specific appliances. The use of a trained classifier and/or regression model is discussed in further detail below.

Techniques Used for Low Frequency Consumption Data

When using low frequency whole-house energy consumption data, the energy contribution of solar panels must be determined and disaggregated. Such disaggregation may be based upon meteorological data. In general, such determination may be made by (i) estimating the solar panel capacity for a specific home; (ii) predicting the solar intensity of the specific home; (iii) based upon the capacity and intensity, predicting solar generation; and (iv) disaggregating the solar energy produced from the low frequency whole-house energy consumption data.

Figure 2:
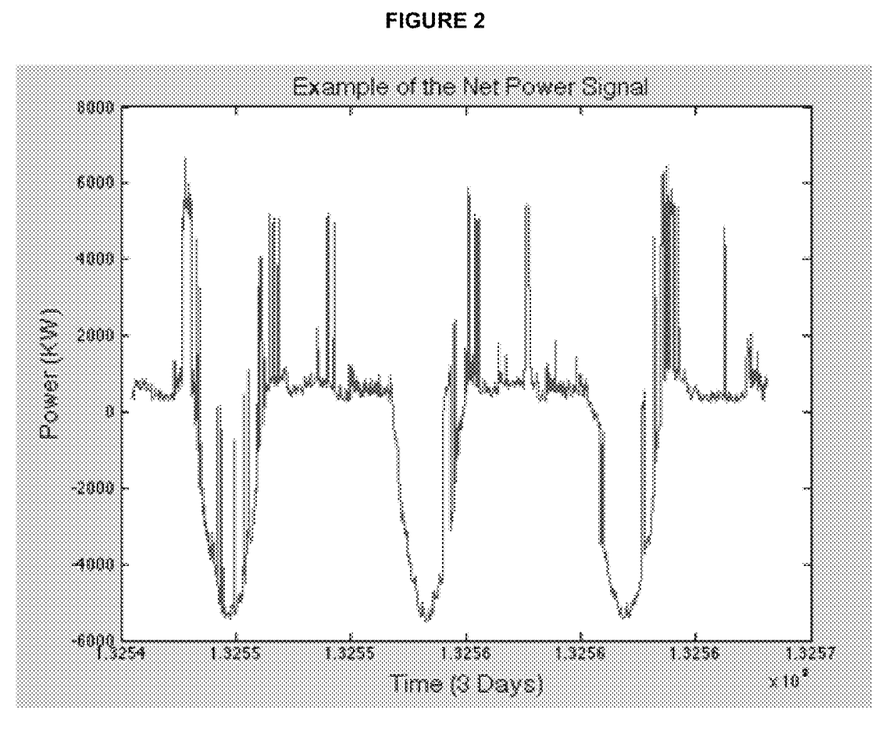
FIG. 2 illustrates an exemplary net power signature over a three (3) day period, in accordance with some embodiments of the present invention.
Figure 3:
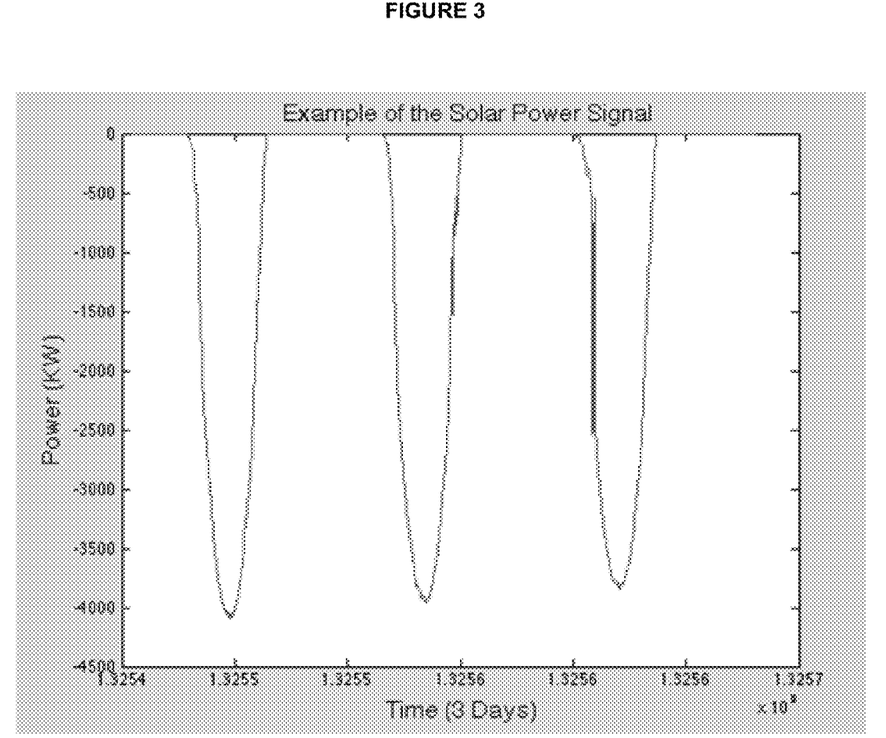
FIG. 3 illustrates an exemplary solar power signal over a three (3) day period, in accordance with some embodiments of the present invention.

In accordance with some embodiments of the present invention, certain techniques for disaggregating low frequency energy consumption data that includes solar panel generation will now be discussed. With reference to FIG. 2, an exemplary net power signature for a specific home over a three (3) day period can be seen. This exemplary net power signature represents the net usage of the home, including any contribution from solar panels. FIG. 3 indicates an exemplary solar power signal over the same three (3) day period. It can be seen from the net power curve in FIG. 2 that the net power becomes negative between sunrise and sunset. Similarly, in FIG. 3 it can be seen that the solar power signal is generally represented by a single major curve per day, between sunrise and sunset.

Solar Panel Capacity Estimation.

Solar panel capacity may be defined as the maximum output of solar panel in kilowatts (kW). This capacity may generally be estimated by examining historical net power signatures. Based upon historical net power signatures, Solar Capacity may be determined by the following equation:

$$SolarCapacity = -1 \times (Baseload - min(DayNet))$$

Where "Baseload" equals the lower $20^{th}$ percentile of net power used by a home during the night (i.e., when there is no or negligible solar contribution), and "DayNet" equals the net power from sunrise to sunset (i.e., appliance consumption minus solar generation).

Note that the signal of the solar panel is always negative since it produces energy. Solar power is generated the most during the day causing the net power signal to become negative. The minimum of net during the day cannot be deemed alone to be the solar capacity, since there are generally other appliances being used during the day which may cause the net power to be generally higher than the solar power generated. Accordingly, a Baseload may be calculated as the lower $20^{th}$ percentile of the net power during the night when solar power is not present. This lower $20^{th}$ percentile represents that twenty (20) percent of the appliances active during the day are also active during the night. The use of the $20^{th}$ percentile was determined through a grid search and produces greater accuracy when comparing ground-truth solar capacity and estimated capacity.

Solar Intensity Prediction.

Next, a regression model may be trained with weather data and the number of hours from sunrise to sunset as one or more independent variables, and solar intensity as the dependent variable.

Solar intensity may be seen as the normalized version of solar generation, and may be stated in the range from 0 to 1. Normalization of the dependent variable may be desirable when using a regression model, because it generally permits or allows the model to be easily trained. In accordance with some embodiments of the present invention, a radial basis function (RBF) support vector machine combined with RBF neural networks may be used. RBF support vector machine and RBF neural networks are machine learning algorithms that may create highly complex non-linear models.

While various other machine learning models and algorithms may be utilized without deviating from the present invention, RBF models may be selected because such models strive to fit Gaussian curves to the data, and is accordingly suited for Gaussian-shaped solar panel generation curves. Such Gaussian-shaped solar panel generation curves may be seen in FIG. 3.

Machine learning models may then be optimized in any number of ways as known in the art. For example, optimization may be performed by obtaining optimal model parameters, 10-fold cross validation, and regularization. For example, models learned based upon data collected over a year for one hundred (100) homes, and were tested upon approximately twenty-five (25) homes to confirm results. Support Vector Machines and neural networks achieved desirable results when given a large amount of training data. Solar intensity testing predictions were accurate—and were recorded at higher accuracies than previous testing—despite training data being obtained from various homes in different parts of the world.

Solar Generation Prediction.

Figure 4:
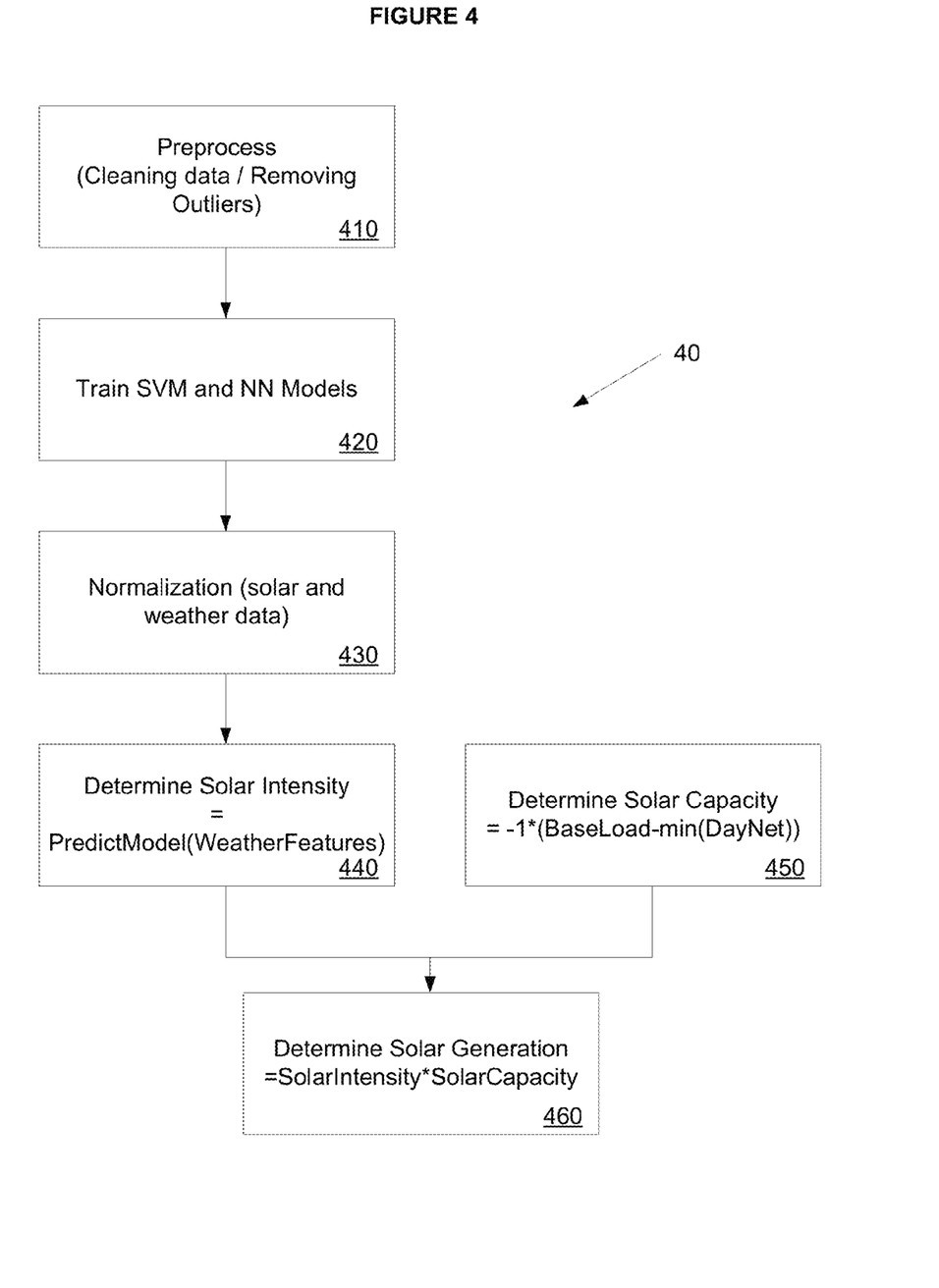
FIG. 4 depicts an exemplary flow for a training and prediction algorithm, in accordance with some embodiments of the present invention.

With reference to FIG. 4, an exemplary flow for training and predicting solar generation based upon low frequency consumption data, in accordance with some embodiments of the present invention, will now be discussed. At 410, a preprocess may be applied to the data set, for example to remove outliers and clean the data from identifiable noise. At 420 a support vector machine (SVM) and neural network (NN) model may be trained (as noted above) with previously acquired data. At 430 solar and weather data may be normalized, and a 440 a solar intensity may be determined. Solar intensity may be based upon the prediction model coupled with identifiable weather features. In addition to solar intensity at 440, at 450 a solar capacity may be determined, based upon the equation noted above. Based upon both the solar intensity and the solar capacity, at 460 the solar generation may be predicted.

Figure 5:
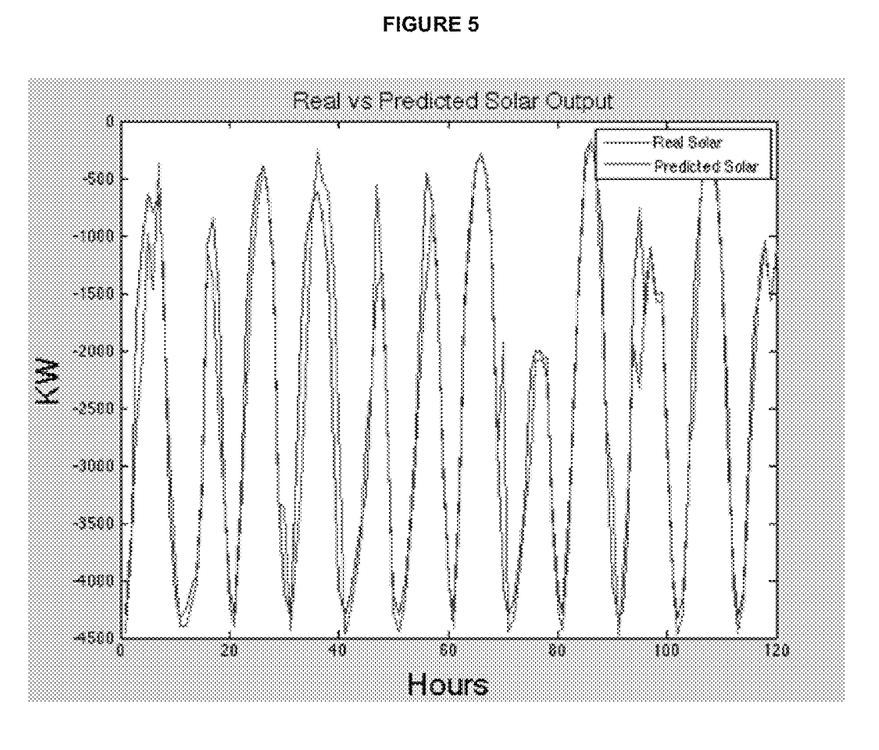
FIG. 5 illustrates an exemplary graph indicating predicted solar power and ground truth solar power for a tested home, in accordance with some embodiments of the present invention.

Based upon the earlier results of the estimated capacity and determined solar intensity prediction, solar generation prediction may be obtained by multiplying the estimated capacity with the solar intensity prediction. The prediction is now transformed back to the KW range. With reference to FIG. 5, an example of a predicted solar panel generation and ground truth generation for a specific home, in accordance with some embodiments of the present invention is depicted.

Solar Energy Disaggregation.

Finally, predicted solar generation may be subtracted from the net power of the specific home, thereby disaggregating the contribution of solar energy from the low frequency whole-house energy consumption data.

Techniques Used for High Frequency Consumption Data

While high frequency data may be useful in providing more accurate energy predictions, high frequency energy consumption data may include an increase in noise, and may be more difficult to correlate meteorological data (which is generally very low resolution) with such high frequency data.

Solar Signal and Appliance Signal Differentiation.

With high frequency data sampled at the one minute level, solar power may be quite noisy. For example, the curve of solar power contribution generated for an exemplary day may include several spikes (for example, due to constantly changing meteorological conditions such as cloud cover). Such spikes may not be merely smoothed, since while spikes may be caused by weather fluctuations, they may also be caused by an appliance being used at the same time. Accordingly, techniques may be desirable that may differentiate spikes from solar signals caused by weather or by appliance usage. In accordance with some embodiments of the present invention, techniques of differentiating such spikes may comprise: (i) identifying correlations between weather and spikes in the data; (ii) establishing spikes caused by weather; (iii) determining features used in appliance usage by using waveform characteristics and transitions; (iv) training a classification model with two (2) classes: weather caused spikes and appliance usage spikes; and (v) performing disaggregation only on spikes that are not determined to be caused by weather.

Solar Energy Prediction and Disaggregation.

Weather features may then be extrapolated from data sampled hourly or by the minute. The solar energy prediction algorithm and models discussed above with low frequency energy data may then be used to accurately predict solar energy contribution, which may then be deducted from the net power in order to obtain solar energy disaggregation.

Applications of Disaggregated Energy Data

Once energy is disaggregated, there are various uses to which such information can be used. For example, such information may be used to (i) provide a solution combining both energy efficiency and demand response; (ii) interact with a programmable communicating thermostat (PCT) for a consumer's benefit; (iii) enable targeted outreach to specific consumers or specific classes of consumers (for example, based upon usage characteristics); and (iv) provide measuring and verification of purported or promised benefits—both from utilities and from other service providers (for example, to track the actual contribution of solar panels, or to determine if appliances are obtaining promised energy usage levels). Each of these are discussed in turn below.

(i) Combining Energy Efficiency and Demand Response.

Many utilities, today, offer Demand Response and Energy Efficiency as two separate programs to consumers. Consumer adoption of Demand response programs is low, potentially because, in most cases, consumers do not see any ongoing benefit from the program. Utilities on the other hand may be able to reduce peak load and therefore avoid blackouts when the generation capacity is close to peak demand.

The current investment by utilities in the Smart Meter infrastructure may allow use of Energy Disaggregation to create a holistic solution that benefits both for consumers and utilities—energy savings for consumers (and utilities with efficiency mandates) and load reduction for utilities.

While a Programmable Communicating Thermostat (PCT) is often seen by some to be the most obvious device in the house that can serve the application, other devices may (for example a load control switch with a capability to talk to Smart Meters) be used instead of a PCT to realize the combination of energy efficiency and demand response. In addition, such application may also be implemented by combining multiple devices in the house.

Hardware involved may include: (a) a smart meter installed by the utility; and (b) a programmable communicating thermostat (PCT) that includes one or both of: a communicating chip capable of talking to Smart Meter (using ZigBee as an example in this invention description but the invention spirit is not limited to ZigBee); and/or a communicating chip capable of talking to internet (can be through the broadband router available in the house or through a cellular connection or through any future communication technologies) (using WiFi as an example for reference in the invention).

Figure 6:
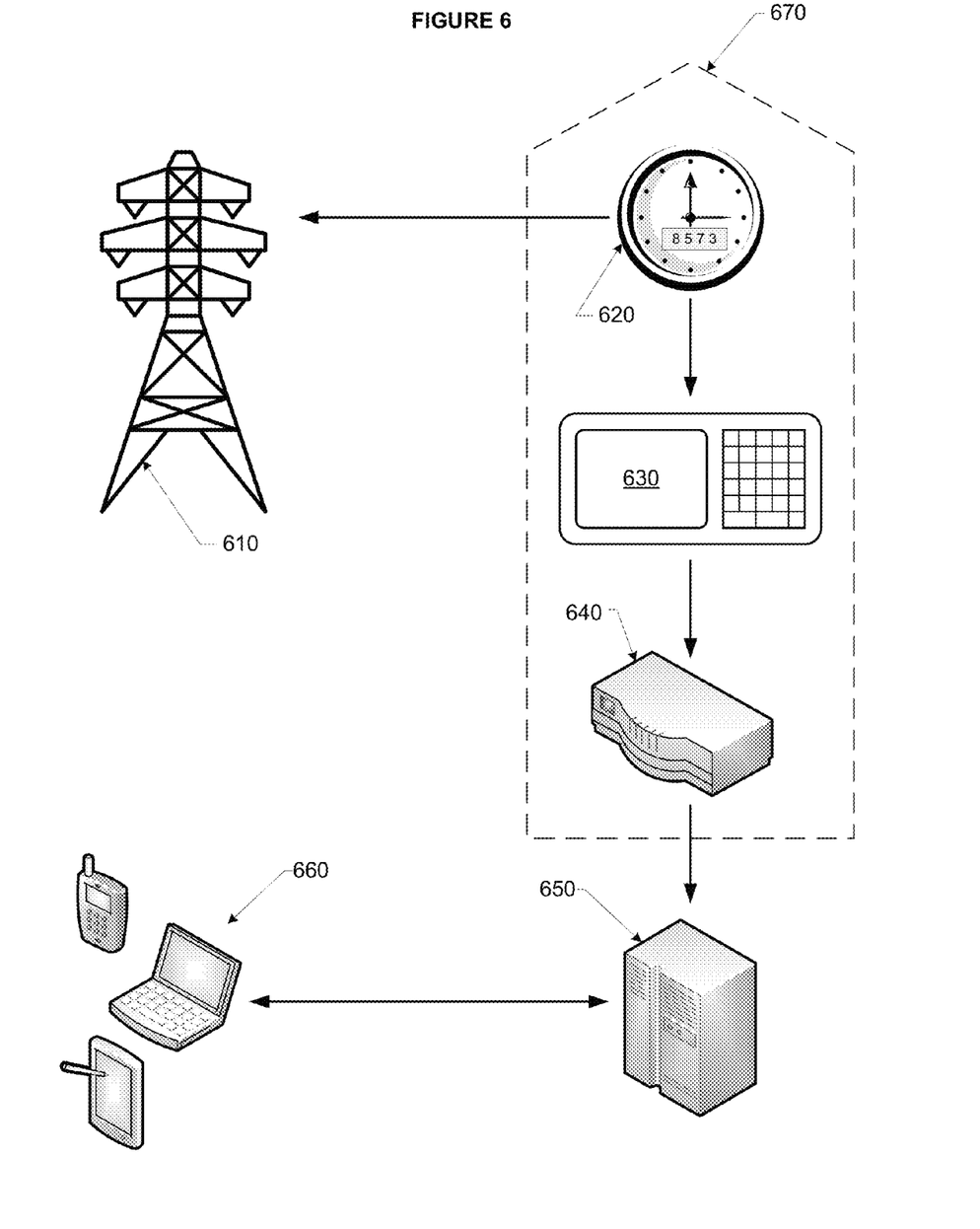
FIG. 6 depicts an exemplary scenario combining both energy efficiency and demand response goals in a solution, in accordance with some embodiments of the present invention.

As shown in FIG. 6, a programmable communicating thermostat may be used with ZigBee and WiFi, in accordance with some embodiments of the present invention. With regard to energy efficiency goals, a consumer may use a PCT with both ZigBee and WiFi interface. The energy use data may be collected from Smart Meter and uploaded to internet based servers using the WiFi Connection. The consumer may access the whole house energy efficiency solution based on energy disaggregation through web and mobile applications.

With continued reference to FIG. 6 a system in accordance with some embodiments of the present invention may comprise a series of a utility 610 providing electricity or other services to a home 670. As the energy enters the home 670, a ZigBee or other HAN 620 may measure the energy provided. A PCT 630 may in communication with the ZigBee 620, as well as in communication with a web or mobile application 660 that may assist in managing energy usage. The PCT 630 may be connected to the web or mobile application 660 via a WiFi or Ethernet connection to a router 640, and/or through an internet server or cloud based server 650.

Therefore, a demand response signal path from a utility may travel from the utility 610 through the ZigBee 620 to the PCT 630, thereby enabling modifications of the PCT based upon such demand response. Energy usage data path may be between the ZigBee 620, PCT 630, router 640, internet/cloud 650, and web or mobile application 660. The PCT 630 may operate based on information received from the ZigBee 620 and the router 640.

With regard to utility demand response concerns, a utility may send a peak demand reduction signal on a peak usage day either using ZigBee or WiFi. The PCT may then cut back the energy usage by reducing the cooling/heating cycles or relax the thermostat set point by a few degrees. Consumers may further program how much cut back they allow based on their personal preferences or on other ambient conditions.

Figure 7:
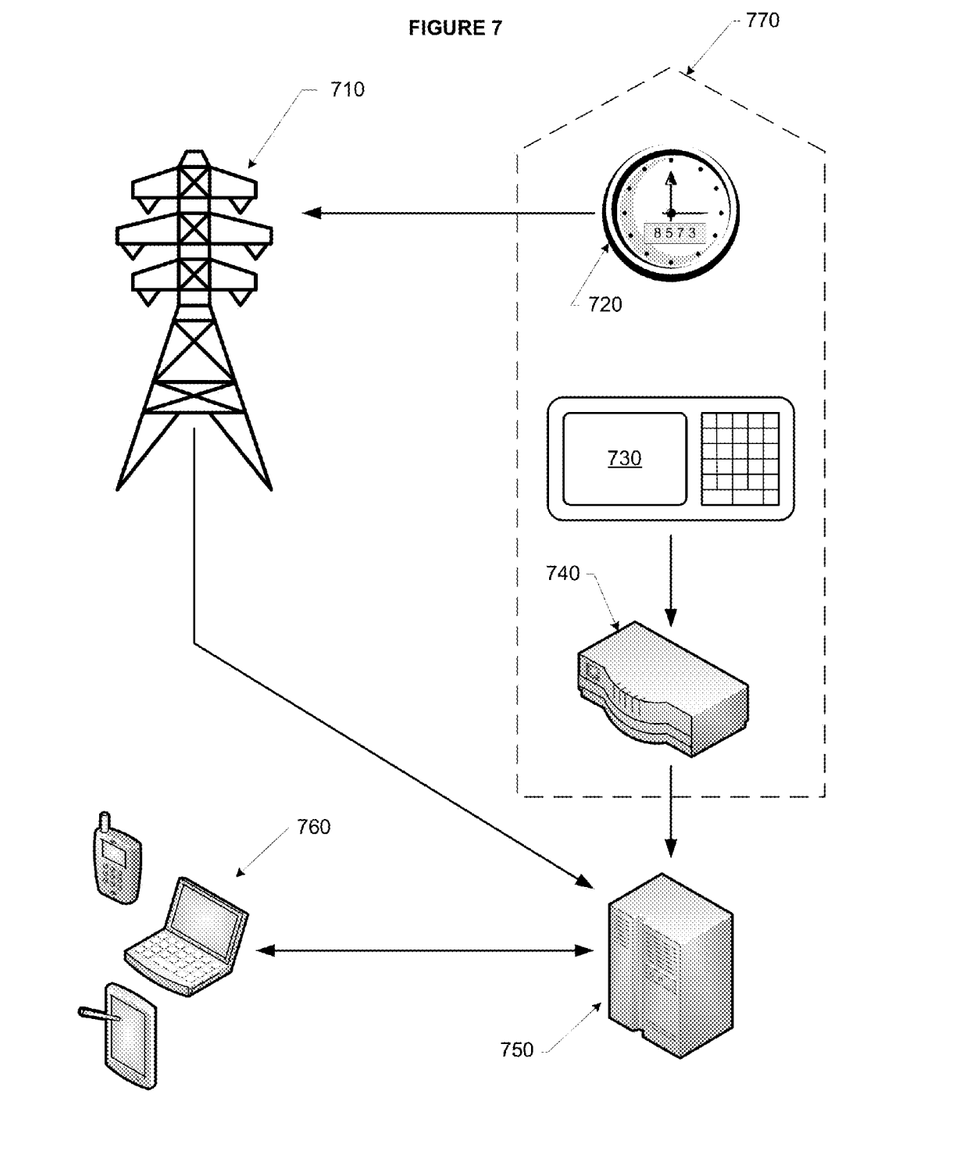
FIG. 7 illustrates an exemplary scenario combining both energy efficiency and demand response goals in a solution, in accordance with some embodiments of the present invention.

As illustrated in FIG. 7, a programmable communicating thermostat may be used with WiFi only, in accordance with some embodiments of the present invention. With regard to energy efficiency goals, the consumer may use a PCT with WiFi interface only. The energy use data may be collected directly from utility servers (sometimes lower resolution and non-real time compared to using a ZigBee). The information transferred from PCT (set points, start and end times and indoor temperature drops with respect to outdoor temperature) helps perform energy disaggregation on the whole house data from utility. The consumer may access the whole house energy efficiency solution based on energy disaggregation through web and mobile applications.

With continued reference to FIG. 7 a system in accordance with some embodiments of the present invention may comprise a series of a utility 710 providing electricity or other services to a home 770. As the energy enters the home 770, a ZigBee or other HAN 720 may measure the energy provided. A PCT 730 may in communication with a web or mobile application 760 that may assist in managing energy usage. The PCT 730 may be connected to the web or mobile application 760 via a WiFi or Ethernet connection to a router 740, and/or through an internet server or cloud based server 750.

With regard to demand response, a utility 710 may send the peak demand reduction signal on the peak demand event day through internet connection to the PCT 730 by way of the internet/cloud 750 and the router 740. The PCT 730 may reduce the energy usage by reducing the cooling/heating cycles or relax the thermostat set point by a few degrees. A consumer may further program how much cut back they allow based on personal preference or on other ambient conditions.

(ii) Interaction of Energy Usage Data with PCT.

This application of energy disaggregation may provide a two-way benefit. For data collected at very low resolution where appliance signatures are not very clear, energy disaggregation becomes harder and loses accuracy. Moreover, there are numerous issues surrounding the use of programmable thermostats. For example, according to some studies, most people never program their thermostat. In addition, even if a PCT is programmed, a consumer's lifestyle is often not as predictable and simple to fit into the time zones made available by existing thermostats (wake up, gone to work, come back, sleep—separate for weekdays and weekends). Moreover, as seasons change, consumer's routines and lifestyles often change—yet again, PCTs are typically not reprogrammed to reflect such changes.

Figure 8:
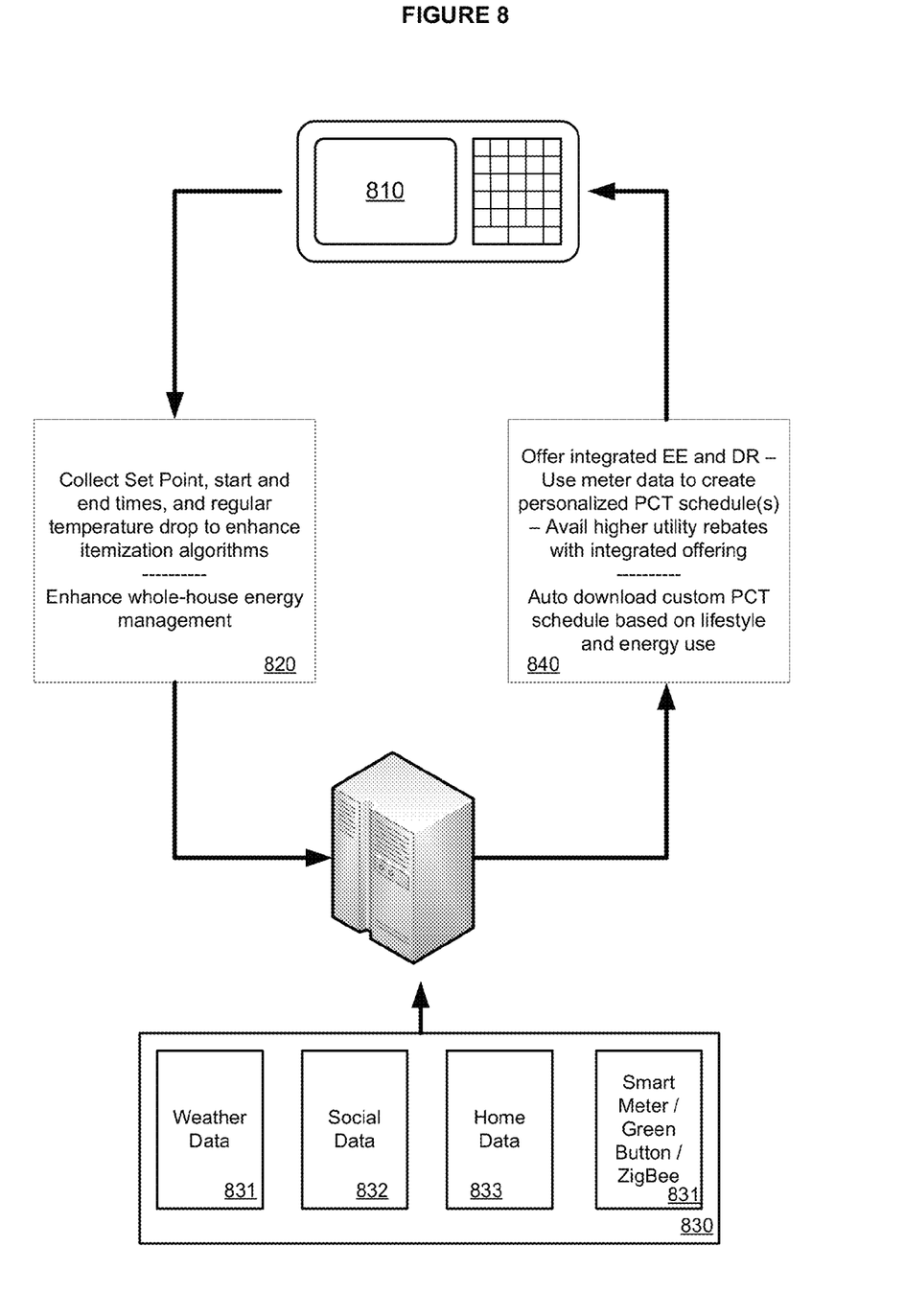
FIG. 8 illustrates an exemplary interaction between energy use data and a programmable communicating thermostat (PCT), in accordance with some embodiments of the present invention.

In accordance with some embodiments of the present invention, one solution to the issues raised above is set forth in FIG. 8, which sets forth an interaction between energy use data and a user's PCT. Such an interaction between energy disaggregation and PCT may help in solving the issues noted above. With reference to FIG. 8, a PCT 810 may receive set point, start and end times, and regular temperature drops from a user. Such collections may be used to enhance whole-house energy management. Additional information 830 may be obtained from online or cloud connections. Such information may be used to offer integrated energy efficiency and demand response, as well as create a personalized PCT schedule that may provide user eligibility for higher utility rebates.

Additional information 830 may be electrical and non-electrical information. For example, weather data 831 may be used to modify PCT settings. Social data 832—such as information from FaceBook or Twitter—may be used to determine when a user is or is not present (for example, either out for an evening or on a vacation). Direct home data 833 such as square footage, date of construction, etc. may be utilized, as well as training data and/or home specific data that may be captured by a smart meter, green button and/or ZigBee-like device(s).

This additional information 830 may be used, through some of the embodiments of the present invention discussed above, to contour the PCT schedule to a specific user in a specific home at a specific time of year.

The PCT may benefit from the energy data analysis. The energy data disaggregation may be used to identify the following characteristics following for any property: (i) "Active Time"—When someone may be inside the property and may be in an active state (not sleeping); (ii) "Passive Time"—When someone may be inside property but may be in a passive state (possibly sleeping), and (iii) Not at Home—When no one may be inside the property.

To determine the user home status—that is, whether or not a user is home or the home is otherwise "active"—low activity period and high activity period can be detected by comparing the energy consumption and frequency of appliance ON/OFF cycles. When the house is deemed active, appliance traces may assist in identifying human behavior. For example, an identifiable base-load may be due to incidental usage resulting from occupancy—lighting, TV, computer, etc. Moreover, cooking or laundry may be detected, as well as heating and cooling. Similarly, it can be determined that a water heater is operating in a manner indicating usage of hot water, rather than a passive mode.

When the house is not active periods of inactivity may be compared to the local time. If the passive or not active time continues longer than few days, a determination of vacation status may be made. Accordingly, various reminders and/or notifications may be sent to the consumer. For example, if a vacation status is determined, a notice may be sent to the user reminding the user to lower the thermostat to avoid excess energy usage. Given the proliferation of programmable communicating thermostats, consumers can often modify home settings remotely (for example, through the use of a smart phone or computer connection).

Once the house schedule is determined, the house schedule may be used to create a custom PCT schedule for the house. This custom schedule may then be automatically downloaded into the PCT. The scheduling may be dynamically updated periodically, for example every day, week or month based on changes in consumer lifestyle detected by energy disaggregation. The creation of custom schedule and auto download tackles the issues described with PCTs earlier in this section.

The energy disaggregation analysis may benefit from inputs from PCT by continuously collecting information such as, but not limited to: (i) a set point of the PCT; (ii) start/end times for identified temperature cycles; (iii) the ambient indoor temperature; and (iv) consumer intervention of schedule and set points (e.g., when a user lowers the temperature "on the fly," for example to account for a particularly warm day.

These parameters may act as important input to the energy disaggregation to make it more accurate, especially in case where the energy data is collected at a lower resolution (example Green button data at one hour interval resolution) and may not contain clear appliance signatures to identify and extract appliance energy use clearly.

Further, the inputs from PCTs combined with energy data may be used to evaluate the thermal envelope of the building and identify if it is efficient. The amount of energy consumed while the heating or cooling is working to get the home indoor temperature to the set point may assist in estimating the thermal mass of the building and its insulation state. This, when compared to what an efficient house should be, may present a highly personalized recommendations to a user, and can also be used for Measurement and Verification of energy savings for the home by comparing before and after any major retrofit.

Figure 9:
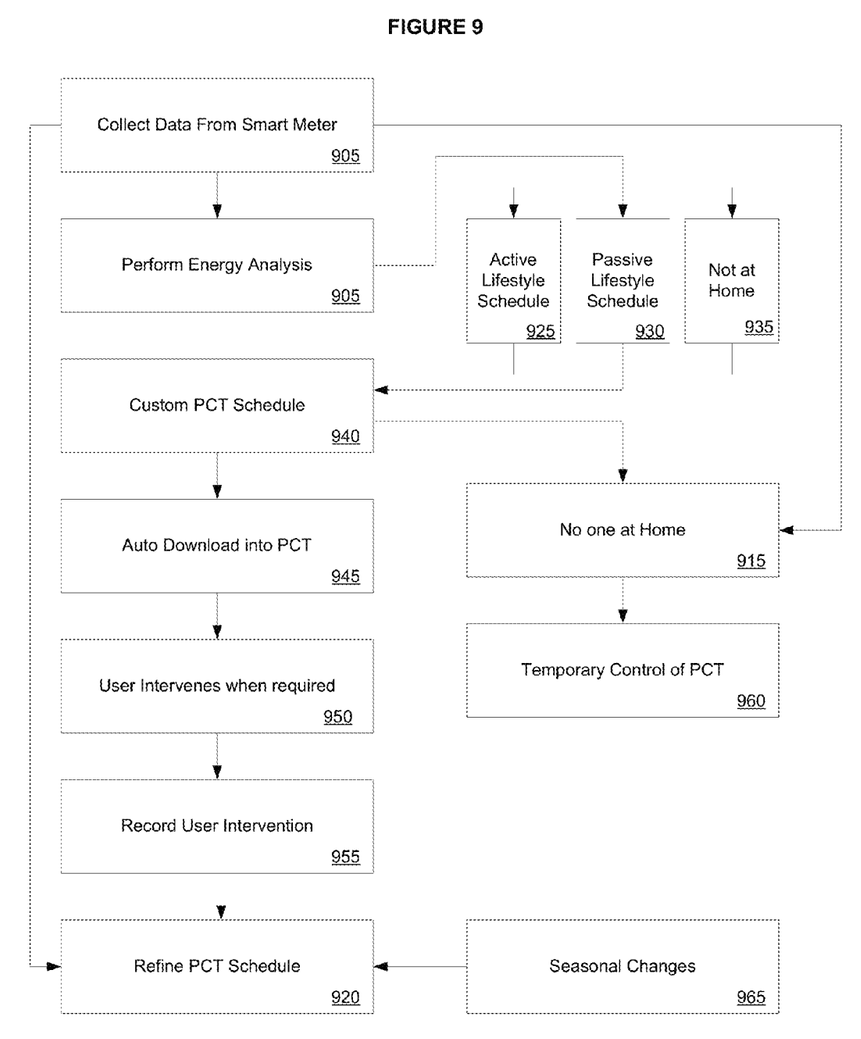
FIG. 9 depicts an exemplary algorithm illustrating an interaction between energy use data and a programmable communicating thermostat (PCT), in accordance with some embodiments of the present invention.

With reference to FIG. 9, an exemplary algorithm 90 for the interaction of energy usage data and a programmable communicating thermostat will now be discussed. At 905, data may be collected from a smart meter, and such data may be provided to perform energy analysis at 910. Such data may be also be used to determine that no one is home (i.e., the house is in a passive or inactive state) at 915, or to modify or refine a schedule of a PCT.

If it is determined at 915 that no one is home, then temporary control of the PCT may be obtained at 960, in order to prevent excess energy usage. If an energy analysis is performed at 910, then various PCT schedules may be determined. Such schedules may include an "Active Lifestyle" schedule 925, a "Passive Lifestyle" schedule 930, and/or a "Not at Home" schedule 935. These schedules 925, 930, 935 may be utilized to form a custom PCT schedule at 940. If, at this time, it is determined that no one is at home at 915, then the process may again revert to 960 where temporary control of the PCT is obtained.

At 945 the custom PCT schedule may be automatically (or manually) downloaded to the PCT. The PCT schedules at 920 may be accordingly refined. During usage, a user may intervene at 950, at which point the PCT and/or the energy usage data may record the user intervention at 955, and use such information at 920 to again refine the PCT schedule. Seasonal changes 965 may also be provided as an input in order to refine the PCT schedule.

In such a manner, the PCT schedule may be continually revised and modified to conform to the actual usage of the user, including vacation times, seasonal changes, etc.

(iii) Targeted Outreach for Utilities.

Utilities often run a number of consumer-oriented programs to save energy and reduce peak load. However, the outreach is not typically effective at targeting appropriate consumers, which may result in higher costs and lower customer adoption. Further, such programs often leave consumers confused due to receiving a number of different program-specific messages from their utilities, many of which may be irrelevant or not useful to a particular consumer.

The energy disaggregation on energy use data collected by utilities for all customers may provide a unique opportunity to efficiently target specific consumers or specific groups of consumers for different programs. For example, a utility with five (5) million users may desire need to implement peak demand reduction in 100,000 homes. In order to obtain participation from 100,000 homes, the utility may typically need to send out approximately one (1) million communications (e.g., flyers, emails, etc.), and often has approximately a 10% customer uptake. With targeted outreach based on energy disaggregation, the number of communications required to obtain 100,000 participants may be reduced to a much lower amount, for example, 500,000, thereby potentially increasing the consumer uptake from 10% to 20%, and accordingly reducing the cost of consumer outreach by hundreds of thousands or even millions of dollars.

The utility energy use data may be collected by a utility for all consumers (or a subset as required by application) may be aggregated or imported into one database storage system. Similarly, energy disaggregation may be performed on some or all of the data in a utilities's system. For example, such disaggregation may be performed as set forth in one or more of the following references, each owned by the applicant and incorporated by reference in their entirety: U.S. patent application Ser. No. 13/366,850, U.S. Provisional Patent Application 61/638,265—filed Apr. 25, 2012, U.S. Provisional Patent Application 61/542,610—filed Oct. 3, 2011, U.S. Provisional Patent Application 61/485,073—filed May 11, 2011, and U.S. Provisional Patent Application 61/439,826—filed Feb. 4, 2011.

A custom report for each utility program using energy disaggregation may be created. For example, for targeting peak demand reduction Smart AC program, the report may be created with following rules—find customers who use their Air Conditioners or Heaters during:

i. Day Hours of 12 pm-7:00 pm
ii. Days Monday through Friday
iii. Temperature>80 degrees Fahrenheit
iv. Use greater than a specified amount of kWh per month
v. Use greater than a specified amount of kWh in each day on heating/cooling
vi. Sort the users by zip codes and peak demand attributed to the use of heating/cooling.

(iv) Measurement and Verification.

It may be desirable to provide measurement and/or verification of certain claims, for example promised benefits of utility sponsored programs. In the past, measurement of the savings/benefits—and therefore verification of a claim or promise of such savings/benefits—has been based on a variety of techniques. Generally speaking, very few of these techniques use the energy use data as collected by utilities. However, with the availability of this data, appropriate analysis of energy use data before and after any program may make measurement and verification more accurate, faster and less expensive for utilities.

The use of energy disaggregation for measurement and verification of a utility sponsored demand response program may be used as an example in the description below. However, this is but one an example. The application of energy disaggregation to measurement and verification of all other programs is similar and contemplated by the present invention.

Method to perform measurement and verification using energy use data in accordance with some embodiments of the present invention may include: the utility energy use data collected by utility for all consumers (or a subset as required by application) may be aggregated or imported into one database storage system. Similarly, the energy disaggregation may be performed on some or all of the data in the system. For example, such disaggregation may be performed as set forth above.

In addition, if required, the reduction in energy (kWh) over a short period of time may be correlated to the reduction in the peak demand (kW) for specific appliance category for the house. Similarly, the data may be normalized to remove the fluctuations of weather or other demographic factors. Moreover, the energy use data for a target set of participating homes (where each home needed to sign up and is known) or a participating region (where each house did not need to sign up and could have still participated in the program) may be compared before and after the program. Only the relevant appliance categories may be compared (example, for a Smart AC program, only the heating and cooling categories are compared since other categories do not get affected by the program). Such information may be used to quantify the benefits or the program based on above comparison.

It will be understood that the specific embodiments of the present invention shown and described herein are exemplary only. Numerous variations, changes, substitutions and equivalents will now occur to those skilled in the art without departing from the spirit and scope of the invention. Accordingly, it is intended that all subject matter described herein and shown in the accompanying drawings be regarded as illustrative only, and not in a limiting sense, and that the scope of the invention will be solely determined by the appended claims.

What is claimed is:

1. A method for remotely setting, controlling, or modifying settings on a programmable communicating thermostat (PCT) in order to customize settings to a specific house and user, comprising:
receiving at a remote processor information entered into the PCT by the user;
receiving at the remote processor:
non-electrical information associated with the specific house or user; and
energy usage data of the specific house;
performing by the remote processor energy disaggregation on the energy usage data, the energy disaggregation assisted by associating periods of high energy use with PCT times to increase accuracy of heating or cooling disaggregation;
determining by the remote processor a custom schedule for the PCT based upon the information entered by the user, the non-electrical information associated with the specific house or user, and disaggregated energy usage data;
revising by the remote processor, the custom schedule for the PCT based upon additional user input or seasonal changes;
providing the custom schedule to the PCT.

2. The method of claim 1, wherein the information entered into the PCT by the user comprises temperature set points, start times and end times.

3. The method of claim 1, wherein the energy usage data is a low resolution whole house profile provided from a utility.

4. The method of claim 1, wherein the energy usage data is received from a smart meter or smart meter home area network.

5. The method of claim 1, wherein the energy usage data is received from one or more of the group consisting of: a current clamp or other device physically attached to the specific house, and information received from a solar company.

6. The method of claim 1, wherein the energy disaggregation comprises:
receiving at the processor a low resolution whole house profile;
selectively communicating with a database comprising:
non-electrical information comprising community specific parameters and specific home parameters; and
training data; and
determining by the processor based on the low resolution whole house profile, the non-electrical information and the training data, individual appliance load profiles for one or more appliances, by at least receiving the whole house profile and determining, using a trained classifier based upon the training data, features present in the whole house profile indicative of incidences of occurrence and/or usage of the individual appliance.

7. The method of claim 6, wherein the non-electrical training information comprises information selected from the group consisting of:
home data of the specific house;
social data of the users; and
neighborhood characteristics.

8. The method of claim 1, wherein the energy usage data comprises contributions from any solar panels or devices installed on the specific house.

9. The method of claim 8, wherein the energy disaggregation includes disaggregation of the solar energy based upon an estimation of solar panel capacity and a prediction of solar intensity.

10. The method of claim 9, wherein an estimation of solar panel capacity is determined based upon a formula of "SolarCapacity=$-1\times$(BaseLoad$-$min(DayNet))" wherein BaseLoad equals the lower $20^{th}$ percentile of net power during night time hours, and DayNet equals net power of the specific house from sunrise to sunset.

11. The method of claim 1, wherein the custom schedule for the PCT comprises a plurality of custom schedules, including:
an active schedule that is implemented by the PCT when the specific house is determined to be occupied;
a passive schedule that is implemented by the PCT when the specific house is determined to not be actively occupied; and
a not-at-home schedule, that is implemented by the PCT when the specific house is determined to not be occupied.

12. The method of claim 11 wherein the passive schedule is implemented by the PCT during sleeping hours or during shorter durations of non-active occupancy of the specific house.

13. The method of claim 1, wherein the customized PCT schedule is provided to a utility in order to provide at least a partial basis for a targeted outreach by the utility.

14. The method of claim 1, wherein the customized PCT schedule is continually modified by the remote processor based upon user inputs, seasonal changes, and non-electrical information received by the remote processor.

15. The method of claim 1, wherein the results of the energy disaggregation are provided to the user or utility in order to support or substantiate claims associated with energy efficiency of specific appliances or specific programs.

16. A method for remotely setting, controlling, or modifying settings on a programmable communicating thermostat (PCT) in order to customize settings to a specific house and user, comprising:
receiving at a remote processor information entered into the PCT by the user, the information comprising temperature set points and start and end times, the information received via a network connection between the PCT and the processor;
receiving at the remote processor:
non-electrical information associated with the specific house or user, non-electrical information received from a plurality of information sources, including publicly available database and weather data; and
energy usage data of the specific house, received from a utility, Smart Meter, or measuring device;
performing by the remote processor energy disaggregation on the energy usage data, the energy disaggregation comprising determining any contribution from solar panels and adjusting for such contribution, the energy disaggregation assisted by associating periods of high energy use with PCT times to increase accuracy of heating or cooling disaggregation;
determining by the remote processor a plurality of custom schedules for the PCT based upon the information entered by the user, the non-electrical information associated with the specific house or user, and disaggregated energy usage data;

revising by the remote processor, the custom schedule for the PCT based upon additional user input or seasonal changes;

providing the custom schedule to the PCT.

17. The method of claim 16, wherein the energy usage data is low resolution energy usage data, and wherein the energy disaggregation comprises:

receiving at the processor a low resolution whole house profile;

selectively communicating with a database comprising training data; and determining by the processor based on the low resolution whole house profile, the non-electrical information and the training data, individual appliance load profiles for one or more appliances, by at least receiving the whole house profile and determining, using a trained classifier based upon the training data, features present in the whole house profile indicative of incidences of occurrence and/or usage of the individual appliance.

18. The method of claim 16, wherein the plurality of custom PCT schedules balance energy efficiency and utility demand response.

19. The method of claim 16, wherein the plurality of customized PCT schedules are continually modified by the remote processor based upon user inputs, seasonal changes, and non-electrical information received by the remote processor.

20. The method of claim 16, wherein results of the energy disaggregation are used to measure and verify the results of a specific utility sponsored program, and wherein the results of the energy disaggregation are used to quantify the benefits of such specific utility sponsored program.

21. A method of energy disaggregation, comprising:

receiving at a processor a whole house profile of energy usage;

selectively communicating with a database, the database including one or more entries comprising training data and non-electrical information received from a programmable communicating thermostat (PCT), including:

one or more temperature set points; and one or more start times and end times of the one or more set points; and determining by the processor, individual appliance load profiles for one or more appliances, the determination based at least in part on the whole house profile, the non-electrical information, and the training data, comprising:

receiving the whole house profile; and determining, using a trained classifier based upon the training data, features present in the whole house profile indicative of incidences of occurrence and/or usage of the individual appliance;

wherein the energy disaggregation is assisted by associating periods of high energy use with PCT times to increase accuracy of heating or cooling disaggregation.

22. The method of energy disaggregation of claim 21, wherein the whole house profile of energy usage is a low resolution whole house profile provided from a utility.

23. The method of claim 21, wherein the whole house profile of energy usage is received from a smart meter or a smart meter home area network.

24. The method of claim 21, wherein the non-electrical information is selected from the group consisting of: community specific parameters, parameters of a specific home in which the PCT is disposed, home data of the specific home, social data of the users, and neighborhood characteristics.

25. The method of claim 21, wherein the whole house profile of energy usage comprises contributions from any solar panels or devices installed on the specific house.

26. The method of claim 25, wherein the energy disaggregation includes disaggregation of the solar energy based upon an estimation of solar panel capacity and a prediction of solar intensity.

* * * * *